(12) United States Patent
Pifer

(10) Patent No.: US 8,028,681 B1
(45) Date of Patent: Oct. 4, 2011

(54) FUEL VAPORIZATION APPARATUS AND METHOD FOR USE IN COMBUSTION ENGINES

(75) Inventor: George Mark Pifer, Albuquerque, NM (US)

(73) Assignee: George M. Pifer, Bernalillo, NM (US)

( * ) Notice: Subject to any disclaimer, the term of this patent is extended or adjusted under 35 U.S.C. 154(b) by 0 days.

(21) Appl. No.: 12/288,081

(22) Filed: Oct. 16, 2008

(51) Int. Cl.
F02M 17/26 (2006.01)

(52) U.S. Cl. ........................................ 123/522; 123/523

(58) Field of Classification Search .......... 123/516–523, 123/1 A, 524, 525, 527, 530, 531, 536–537, 123/545–547

See application file for complete search history.

(56) References Cited

U.S. PATENT DOCUMENTS

| | | | | |
|---|---|---|---|---|
| 583,126 A | * | 5/1897 | Ryder | 261/70 |
| 583,818 A | * | 6/1897 | Redmon | 261/70 |
| RE11,633 E | * | 10/1897 | Best | 123/523 |
| 610,159 A | * | 8/1898 | Speer | 261/125 |
| 683,125 A | * | 9/1901 | Laurent et al. | 261/18.3 |
| 706,454 A | * | 8/1902 | Robinson | 96/343 |
| 775,859 A | * | 11/1904 | Russell et al. | 48/144 |
| 781,701 A | * | 2/1905 | Walther | 261/70 |
| 793,786 A | * | 7/1905 | Helmle | 261/122.1 |
| 2,882,882 A | * | 4/1959 | Pantano | 123/557 |
| 3,653,364 A | * | 4/1972 | Bogan | 123/3 |
| 3,665,906 A | * | 5/1972 | De Palma | 123/519 |
| 3,696,589 A | * | 10/1972 | Liebig et al. | 96/300 |
| 3,792,688 A | | 2/1974 | Grainger | |
| 3,844,739 A | * | 10/1974 | Alfrey, Jr. | 95/146 |
| 3,945,352 A | | 3/1976 | Reimuller | |
| 4,011,843 A | | 3/1977 | Feuerman | |
| 4,015,570 A | | 4/1977 | Sommerville | |
| 4,038,952 A | | 8/1977 | Nagano | |
| 4,068,638 A | * | 1/1978 | Butler, Jr. | 123/557 |
| 4,083,344 A | | 4/1978 | Sakurai et al. | |
| 4,094,290 A | * | 6/1978 | Dismuke | 48/189.6 |
| 4,133,847 A | | 1/1979 | Feuerman | |
| 4,149,497 A | | 4/1979 | Zeliszkewycz | |
| 4,175,525 A | * | 11/1979 | Johnson | 123/522 |
| 4,175,526 A | * | 11/1979 | Phelan | 123/520 |
| 4,191,153 A | | 3/1980 | Strem et al. | |
| 4,204,485 A | | 5/1980 | Perepolkin | |
| 4,248,192 A | | 2/1981 | Lampard | |
| 4,257,366 A | * | 3/1981 | Strem et al. | 123/554 |
| 4,274,383 A | | 6/1981 | Adams | |
| 4,276,131 A | * | 6/1981 | Feuerman | 205/342 |
| 4,312,317 A | | 1/1982 | Jewett et al. | |
| 4,332,224 A | | 6/1982 | Latsch et al. | |
| 4,342,303 A | * | 8/1982 | McCord | 123/557 |
| 4,366,797 A | | 1/1983 | Jackson et al. | |
| 4,372,275 A | | 2/1983 | Schmidt | |
| 4,373,494 A | * | 2/1983 | McMahon | 123/538 |
| 4,397,286 A | | 8/1983 | Jackson et al. | |
| 4,412,521 A | | 11/1983 | Silva, Jr. | |
| 4,483,307 A | * | 11/1984 | Gilmor | 123/558 |

(Continued)

*Primary Examiner* — Thomas Moulis

(57) ABSTRACT

This invention is an after market stand alone complete replacement fuel delivery system that works independent of and after disconnecting the standard liquid fuel delivery system for a fuel injected internal combustion engine. This device creates pressurized gasoline vapors at approximately 35 psi to 90 psi mixed and charged with large amounts of processed compressed air to achieve a gasoline vapor in it's purest form to utilize substantially more of the gasoline's energy potential which will greatly reduce engine emissions to much lower levels and improving the general performance of a gasoline fueled internal combustion engine essentially in the same pressurized gas form as found in a propane or natural gas fuel system, and to be refitted to existing gasoline fuel injected engines.

15 Claims, 1 Drawing Sheet

U.S. PATENT DOCUMENTS

| | | | | |
|---|---|---|---|---|
| 4,488,517 A | * | 12/1984 | Yoon | 123/3 |
| 4,509,464 A | * | 4/1985 | Hansen | 123/1 A |
| 4,517,926 A | * | 5/1985 | Reinhard et al. | 123/3 |
| 4,523,548 A | * | 6/1985 | Engel et al. | 123/1 A |
| 4,531,558 A | * | 7/1985 | Engel et al. | 141/44 |
| 4,574,764 A | * | 3/1986 | Earle | 123/545 |
| 4,578,091 A | * | 3/1986 | Borja | 95/214 |
| 4,758,153 A | * | 7/1988 | Forster | 431/208 |
| 4,862,859 A | * | 9/1989 | Yunick | 123/545 |
| 4,887,556 A | * | 12/1989 | Gladstone | 123/1 A |
| 4,955,351 A | | 9/1990 | Lewis et al. | |
| 5,002,596 A | * | 3/1991 | Moskaitis et al. | 96/152 |
| 5,005,550 A | * | 4/1991 | Bugin et al. | 123/520 |
| 5,019,120 A | | 5/1991 | Lewis et al. | |
| 5,048,499 A | * | 9/1991 | Daywalt | 123/538 |
| 5,074,273 A | * | 12/1991 | Brown | 123/538 |
| 5,226,400 A | * | 7/1993 | Birch | 123/557 |
| 5,393,329 A | * | 2/1995 | Inagaki et al. | 96/131 |
| 5,393,723 A | * | 2/1995 | Finkl | 502/341 |
| 5,482,024 A | * | 1/1996 | Elliott | 123/516 |
| 5,836,290 A | | 11/1998 | Gilbert | |
| 5,970,957 A | * | 10/1999 | Fried et al. | 123/516 |
| 6,014,958 A | * | 1/2000 | Miwa et al. | 123/520 |
| 6,138,615 A | * | 10/2000 | Boisset et al. | 123/3 |
| 6,155,239 A | | 12/2000 | Dykstra | |
| 6,189,803 B1 | * | 2/2001 | Ganan-Calvo | 239/5 |
| 6,257,212 B1 | * | 7/2001 | Hammond | 123/557 |
| 6,432,148 B1 | * | 8/2002 | Ganan-Calvo | 44/308 |
| 6,503,301 B2 | * | 1/2003 | Uchino et al. | 96/132 |
| 6,526,952 B1 | | 3/2003 | Price | |
| 6,681,749 B2 | * | 1/2004 | Bushnell et al. | 123/549 |
| 6,695,895 B2 | * | 2/2004 | Hyodo et al. | 96/111 |
| 6,732,718 B2 | * | 5/2004 | Kano et al. | 123/518 |
| 6,758,194 B2 | | 7/2004 | Shetley et al. | |
| 6,966,308 B2 | * | 11/2005 | Bushnell et al. | 123/546 |
| 7,011,048 B2 | * | 3/2006 | Gurin et al. | 123/1 A |
| 7,028,675 B2 | | 4/2006 | Bushnell et al. | |
| 7,100,583 B2 | * | 9/2006 | Lu | 123/536 |
| 7,487,763 B2 | * | 2/2009 | Miyasaka | 123/538 |
| 7,703,444 B2 | * | 4/2010 | Schondorf et al. | 123/518 |
| 2005/0224058 A1 | * | 10/2005 | Kim | 123/538 |
| 2007/0074683 A1 | * | 4/2007 | Matsuo et al. | 123/41.01 |
| 2007/0214720 A1 | | 9/2007 | Wen | |
| 2008/0022979 A1 | | 1/2008 | Ward | |
| 2008/0190401 A1 | * | 8/2008 | Guo | 123/538 |
| 2009/0071449 A1 | * | 3/2009 | Choi | 123/538 |

* cited by examiner

FUEL VAPORIZATION APPARATUS AND METHOD FOR USE IN COMBUSTION ENGINES

FIELD OF THE INVENTION

The present invention involves improvements in an internal combustion engine by eliminating and replacing the original fuel delivery system with this device that injects compressed air to be mixed with compressed vaporized gasoline delivered to the engine in place of liquid gasoline achieving maximum burn and energy levels to reduce emissions and promote fuel efficiency as an after market installation alternative fuel delivery system for most gasoline engines using fuel injectors.

SUMMARY OF THE INVENTION

Figure 1:
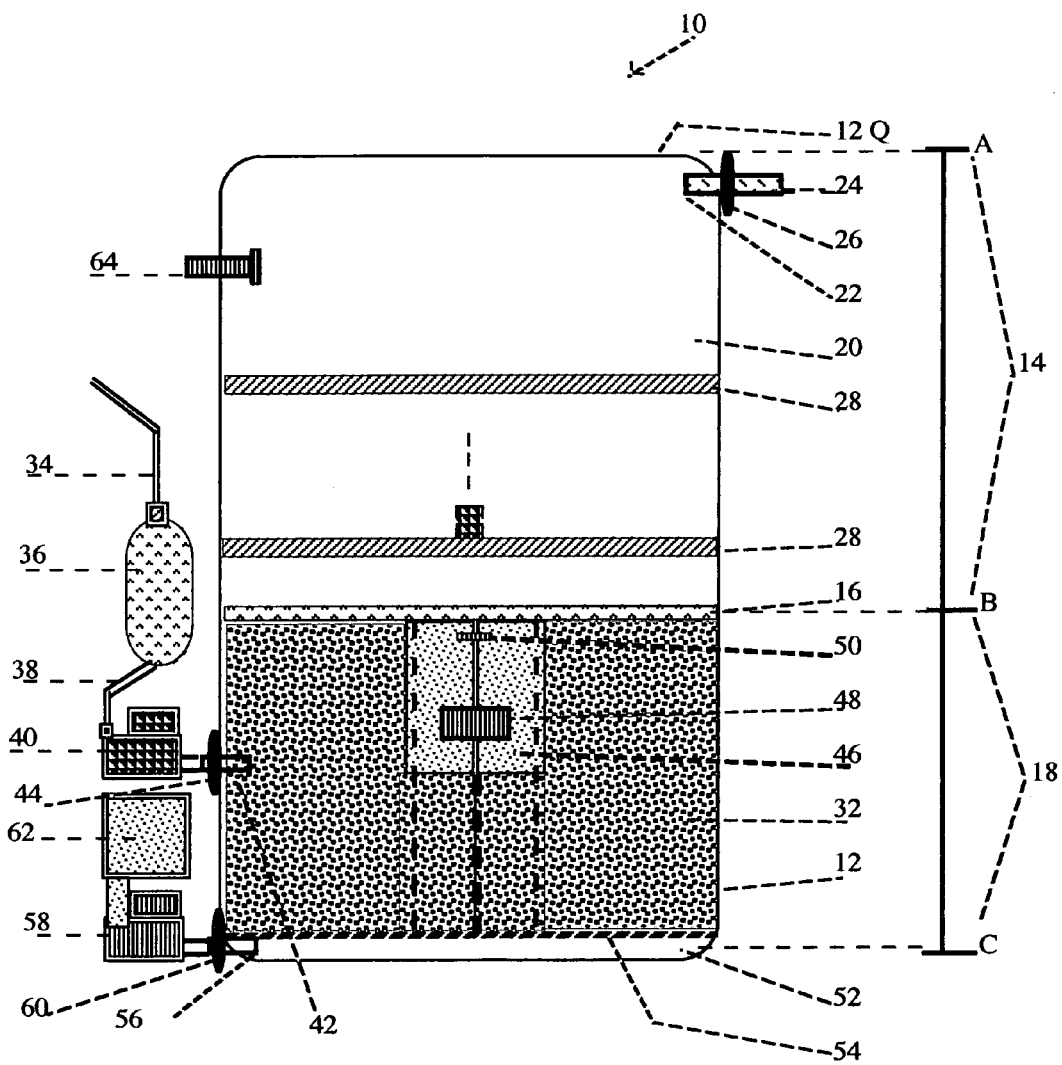
FIG. 1 is a cross-section of the vaporization chamber of the present invention, showing an upper fume collection area, a lower BB pack area, an air space, and additionally depicting a fuel pump and filter, an air pump and filter and the fluid connections between these and the vaporization chamber.

The present invention comprises a vaporization device adapted for use with internal combustion engines. More particularly, it involves use of an external vaporization chamber for mixing fuel vapor with air for provision to a combustion chamber.

The invention is a fuel vaporization chamber for internal combustion engines having a lower BB pack with a multiplicity of BBs for adsorption of a fuel to provide increased surface area exposure of the fuel, an upper fume collection area separate from liquid fuel, and an air space disposed below the lower BB pack wherein compressed air is forced into the air space and disposed upwardly through the BB pack.

The invention may additionally have a BB pack screen for securing the BB pack within a lower area of the chamber. Additionally, it may have at least one splash plate, and the splash plate may be made of a porous non-petroleum absorbent material.

The BBs can be made of glass, copper, and/or steel.

The invention can have an additional perforated-wall chamber within the BB pack with a fuel float. The float can either activate or turn off a fuel pump in fluid connection with the vaporization chamber depending on the level of the float. There can be a liquid fuel sensor within the fume collection area which can be disposed on at least one of the at least one splash plate.

There may be an air pressure sensor within the fume collection area which can be within the air space. A perforated screen may be disposed between the BB pack and the air space which might be comprised of a multi-ported air tube.

The device may utilize manual shut off valves to at least one of an incoming air line, an incoming fuel line, and an outgoing fuel vapor delivery line.

The device utilizes the method for fuel vaporization in an internal combustion engine which entails placing fuel in an adsorbent material; forcing compressed air through the fuel in the adsorbent material; and collecting the vaporized fuel. The adsorbent material may be comprised of non-petroleum absorbent BBs. The BBs may be glass, copper, and/or steel. In this method, there may be an additional step of equating the pressure of the compressed air introduced to a range between approximately 10 p.s.i. above and below the p.s.i. of fuel introduced, and/or an alternate additional step of collecting condensed liquid fuel for further use.

This invention is designed to be an after market replacement fuel delivery system to be used in place of, and not in combination with, existing fuel delivery systems for most fuel injected gasoline engines. The air and fuel pump deliver compressed fuel and air under the pressure needed for the application to the fuel vaporization and air mixing tank chamber creating a pure fuel energy charged air mixture then delivering this mixture to the engine injectors creating a near complete fuel burn using most all of the fuel's energy and in it's most efficient form achieving greatly reduced emissions and increasing engine efficiency.

BACKGROUND OF THE INVENTION

1. Field of the Invention

The present invention relates generally to a method and apparatus for producing a combustible vapor, mixing gasoline (or other fuel) with air, for an internal combustion engine, more particularly, to vaporization devices for fuel for such engines.

2. Description of the Prior Art

The internal combustion engine has been with us for a long time, since the designs of Christian Huygens in 1680 which burned gunpowder. Significant improvements over the years have been made in many areas of the engine, with the development of better fuels and better designs to burn those fuels. Since the development of the gasoline engine, one particular area that has seen advancement is the carburetor and carburetor/fuel injection systems. In U.S. Pat. No. 3,945,352 to Reimuller in 1976, the Applicant there noted that "[h]eretofore, virtually all internal combustion engines using liquid hydrocarbon fuel, such as gasoline or diesel oil, have utilized carburetors or fuel injectors to deliver the liquid fuel into the intake air, or into the combustion chamber, in the form of finely atomized mist, which is supposed to evaporate completely, with the result that some of the fuel is still in liquid form during the combustion state, and because of this it burns incompletely, leaving a considerable amount of unburned fuel in the exhaust to pollute the atmosphere . . . [which] . . . also means reduced efficiency, lower power output, and poor fuel consumption characteristics."

Given such, different approaches to minimizing droplet size have been tried over the years as evidenced in a plethora of prior art patents. Some of the earlier inventors to consider actually utilizing vapor instead of liquid gasoline were Christian Reimuller (U.S. Pat. No. 3,945,352) in 1976, Arnold Feuerman (U.S. Pat. No. 4,011,843) in 1977, and S. Smith Sommervile (U.S. Pat. No. 4,015,570) in 1977. Reimuller's early attempt utilized vaporizing gasoline in a flash boiler wherein the gasoline would then instantly ignite when introduced to air. This method did reduce the amount of gasoline used, however, the instant ignition required the introduction of air to be in the combustion chamber itself and increased the explosive danger of an engine. Feuerman's device, instead of utilizing a boiler, creatively passed electric current through an electrolytically conductive emulsion of gasoline and water.

Unfortunately, modern engines are not equipped to handle the introduction of water, even in vapor form. Feuerman, who has been prolific, also obtained related U.S. Pat. Nos. 4,133, 847 (1979); 4,246,082 (1981); and 4,276,131 (1981) which suffer from the same difficulty. Sommerville, utilizes a somewhat simple vaporization system wherein fuel is atomized into a vaporizer chamber and contained hot water pipes extending through the chamber heat the fuel to promote vaporization, and baffles are utilized to "catch" non-aerosolized droplets. Air is "fed" into the chamber by means of engine vacuum pulling air through the chamber. The difficulty with the Sommerville device is the need to heat the chamber and the lack of control over the exact air/vapor mix. Later devices such as that introduced in 1980 by Perepolkin (U.S. Pat. No. 4,204,485), also suffer from similar deficiencies such as utilization of water in the admixture or utilization of engine vacuum by Strem et al. (U.S. Pat. Nos. 4,191,153 (1980) and 4,257,366 (1981)).

Therefore, what is needed in the art is a device that is compatible with modern engines which provides a reliable concentration of fuel vapor mixed with air without relying on external heating to produce the vapor since that would require pre-heating of an engine).

DESCRIPTION OF A PREFERRED EMBODIMENT

The present invention comprises a vaporization device adapted for use with internal combustion engines. More particularly, it involves use of an external vaporization chamber for mixing fuel vapor with air for provision to a combustion chamber.

The preferred embodiment of the invention comprises a vaporization apparatus for use with an internal combustion engine. More specifically, it comprises a vaporization chamber having a fuel permeated pack, compressed air flow, and a fume collection area.

As depicted in FIG. 1, vaporization chamber 10 comprises a tank 10 having wall or walls 12 comprised of materials well-known in the art, including but not limited to steel. Tank 10 has an upper area 14 encompassing the interior space of tank 10 generally from a top wall 12a of tank 10 to a BB pack securing screen 16. Tank 10 additionally has a lower area 18 encompassing the interior space of tank 10 generally from a bottom wall 12b of tank 10 up to and including BB pack securing screen 16. Upper area 14 is depicted on FIG. 1 as encompassing the area between letters a and b. Lower area 18 is depicted on FIG. 1 as encompassing the area between letters b and c.

Upper area 14 encompasses a fume collection area 20 with fume exit orifice 22 opening to a fuel intake delivery line 24 (or in an alternative embodiment, a secondary fume tank preceding the fuel intake). Preferably, optional manual shut off valve 26 is located either at orifice 22 or adjacent or nearly adjacent to orifice on delivery line 24 for maintenance purposes. Preferably, upper area 14 additionally comprises at least one optional splash plate 28 to prevent fuel splash into fume collection area 20 in order to reduce the introduction of liquid fuel into delivery line 24. FIG. 1 additionally depicts second splash plate 28' for further protection against such. Upper area 14 further optionally contains liquid fuel sensor 30, shown disposed on splash plate 28 in FIG. 1. As can be appreciated, sensor 30 could be disposed in alternate locations such as on wall 12 in upper area 14, however, it would be most advantageously disposed above splash plate 28 or at least above BB pack screen 16.

Lower area 12 encompasses BB pack 32 which comprises BB or other gradient fill of non-absorbent materials such as but not limited to non-petroleum reactive materials such as glass, copper, or steel BBs (preferably rounded "ball-shaped" packing). This packing/fill/BBs provides an adsorbent surface for the liquid fuel to adhere to, providing a greater exposed surface area allowing fuming of the fuel. Fuel is brought to the vaporization chamber originally from the main fuel tank (not depicted) through fuel line 34 to fuel filter 36, through fuel line 38 to fuel pump 40 and into vaporization chamber 10 via fuel delivery orifice 42 located below BB back screen 16 and into BB pack 32. Preferably, a manual shut-off valve 44 is located between fuel pump 40 and vaporization chamber 10 for maintenance purposes.

Within BB pack 32, is preferably an inner chamber 46, typically comprising a cylinder or other common configuration known in the art, wherein the inner chamber is formed of a perforated wall or walls 48, and wherein a standard fuel float 50 known in the art may be located outside of BB pack 32 such that the float is free within the fuel and may thereby be used to activate a fuel pump auto shut off switch (not depicted).

At the bottom of lower area 18, a small air space 52 is created by the disposition of porous plate 54 above but not adjacent to the bottom of tank 10. Air delivery orifice 56 in tank wall 12 of tank 10 is in fluid connection with air pump 58, having, preferably, manual shut off valve 60 disposed at either orifice 56 or on an air line connecting air pump 58 to tank 10. Further, preferably, air filter 62 is shown in fluid connection with air pump 58.

Preferably, air pump 58 is a 12 volt DC powered pump delivering an approximate working pressure of between approximately 25 p.s.i. and approximately 90 p.s.i. Preferably, a pressure sensor 64 disposed with upper area 14 and above any fuel will be utilized to signal the air pump to turn on or off at the desired pressure range. Alternatively, sensor 64 could be disposed within space 52.

Preferably air pump 58, will operate at a pressure range between approximately 10 p.s.i. above or below the p.s.i. utilized by the fuel pump, such that, for example, if the fuel pump were operating at 70 p.s.i., the air pump would operate at a range of between 60 p.s.i. and 80 p.s.i. for maximum efficiency. However, it is anticipated that the described device could operate at a wider range but at a likely decreased efficiency.

In an alternate embodiment, a multi-ported distribution tube or chamber could be substituted for plate 54.

One embodiment of the invention described herein would utilize an approximately two gallon tank 10. However, it is anticipated that different volume tanks could be utilized with success and depending on the size of the engine and the vaporized fuel/air mixture amount required.

It is further anticipated that an inline condensed liquid fuel return can be utilized in conjunction with the disclosed invention. For example, a 12 volt intermittent one way valve connecting directly or indirectly with the main fuel tank could be opened, for example for approximately one (1) second every two (2) to five (5) minutes allowing condensed liquid fuel to return to the main fuel tank. This could be accomplished with a high pressure bowl, placed at a low spot in the high pressure fuel vapor delivery line to the engine, collecting the condensed liquid fuel.

Finally, it is understood that different tank size, p.s.i. ratios and measures, as well as air and fuel pump types and mounting locations may be utilized. Locating of pumps, tanks, etc. as depicted herein are not understood to be limiting, but were located for ease of description and depiction only. It is envisioned that many differing configurations will be utilized and the embodiments depicted herein are offered to be illustrative but not limiting of the invention.

What is claimed is:

1. A fuel vaporization mixed with pressurized air chamber for internal combustion engines comprising:
   a lower small adsorbent balls BB pack comprised of a multiplicity of small adsorbent balls for adsorption of a fuel to provide increased surface area exposure of the fuel while mixing with pressurized air;

an upper fume collection area separate from liquid fuel;
an air space disposed below said lower BB pack wherein compressed air is forced into said air space and disposed upwardly through said BB pack.

2. The apparatus of claim 1 additionally comprising a small adsorbent balls BB pack screen for securing said small adsorbent balls BB pack within a lower area of said chamber.

3. The apparatus of claim 1 additionally comprising at least one splash plate.

4. The apparatus of claim 3 wherein said splash plate is comprised of a porous rigid nonpetroleum absorbent material.

5. The apparatus of claim 1 wherein said small adsorbent ball BB's are selected from the group consisting of glass, copper, and steel.

6. The apparatus of claim 1 comprising an additional perforated-wall chamber within said small adsorbent balls BB pack, wherein said chamber contains a fuel float.

7. The apparatus of claim 6 wherein said float activates or turns off a fuel pump in fluid connection with said vaporization chamber depending on the level of said float.

8. The apparatus of claim 1 additionally comprising a liquid fuel sensor within said fume collection area.

9. The apparatus of claim 3 wherein a liquid fuel sensor is disposed on at least one of said splash plates.

10. The apparatus of claim 1 additionally comprising an air pressure sensor within said fume collection area regulating pressurized air input.

11. The apparatus of claim 1 additionally comprising an air pressure regulating sensor within said air space.

12. The apparatus of claim 1 additionally comprising a perforated screen disposed between said small adsorbent balls BB pack and said air space.

13. The apparatus of claim 1 wherein said air space is comprised of a multi-ported air tube.

14. The apparatus of claim 1 additionally comprising manual shut off valves to at least one of an incoming air line, an incoming fuel line, and an outgoing fuel vapor delivery line.

15. A method for fuel vaporization combining said fuel vapor with air comprising:
placing fuel in small adsorbent balls BB pack forcing compressed air through the fuel in the adsorbent material;
collecting the vaporized fuel and air mix in upper area;
introducing fuel into a chamber at a pressure of 10 psi greater than chamber pressure.

* * * * *